US008738995B2

(12) United States Patent
Emerson et al.

(10) Patent No.: US 8,738,995 B2
(45) Date of Patent: May 27, 2014

(54) MEMORY SUBSYSTEM HAVING A FIRST PORTION TO STORE DATA WITH ERROR CORRECTION CODE INFORMATION AND A SECOND PORTION TO STORE DATA WITHOUT ERROR CORRECTION CODE INFORMATION

(75) Inventors: Theodore F. Emerson, Tomball, TX (US); David F. Heinrich, Tomball, TX (US); Hung Q. Le, Katy, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 177 days.

(21) Appl. No.: 13/384,678

(22) PCT Filed: Sep. 10, 2009

(86) PCT No.: PCT/US2009/056467
§ 371 (c)(1),
(2), (4) Date: Jan. 18, 2012

(87) PCT Pub. No.: WO2011/031260
PCT Pub. Date: Mar. 17, 2011

(65) Prior Publication Data
US 2012/0124448 A1 May 17, 2012

(51) Int. Cl.
*G11C 29/00* (2006.01)

(52) U.S. Cl.
USPC ............................................ 714/768

(58) Field of Classification Search
USPC ............... 714/758, 766, 768, 774, 746, 777
See application file for complete search history.

(56) References Cited

U.S. PATENT DOCUMENTS

| | | | |
|---|---|---|---|
| 6,941,505 B2* | 9/2005 | Yada et al. | ............ 714/763 |
| 2003/0070054 A1 | 4/2003 | Williams et al. | |
| 2006/0123320 A1 | 6/2006 | Vogt | |
| 2007/0220354 A1 | 9/2007 | Moyer | |
| 2008/0005646 A1 | 1/2008 | Bains | |

OTHER PUBLICATIONS

International Search Report and Written Opinion, International Searching Authority, 15 pages, May 31, 2010.

* cited by examiner

*Primary Examiner* — Shelly A Chase

(57) ABSTRACT

A system comprising a memory subsystem having at least one memory device, and a memory controller to control access of the memory subsystem, wherein the memory controller is configured to store data with error correction code (ECC) information in a first portion of the memory subsystem, and to store data without ECC information in a second portion of the memory subsystem.

16 Claims, 4 Drawing Sheets

MEMORY SUBSYSTEM HAVING A FIRST PORTION TO STORE DATA WITH ERROR CORRECTION CODE INFORMATION AND A SECOND PORTION TO STORE DATA WITHOUT ERROR CORRECTION CODE INFORMATION

CROSS-REFERENCE TO RELATED APPLICATION

This application is a national stage application under 35 U.S.C. §371 of PCT/US2009/056467, filed 10 Sep. 2009.

BACKGROUND

An electronic device such as a computer employs a memory subsystem having one or more memory devices. In some cases, the memory subsystem can be configured to store data with error correction code (ECC) information such that certain types of errors in the data can be detected and corrected. The ECC information be used to provide protection against errors in the data of up to a predefined number of bits.

An issue associated with using ECC protection for data stored in a memory subsystem is that ECC information can take up a substantial portion of storage capacity. For every collection of data bits of a certain length (e.g., a byte), corresponding ECC information is stored. For example, for every byte of data, the accompanying ECC information can take up 5 or 6 bits. As a result, when ECC protection is used, the available storage capacity of a memory subsystem is reduced.

BRIEF DESCRIPTION OF THE DRAWINGS

Some embodiments of the invention are described with respect to the following figures.

DETAILED DESCRIPTION

Figure 1:
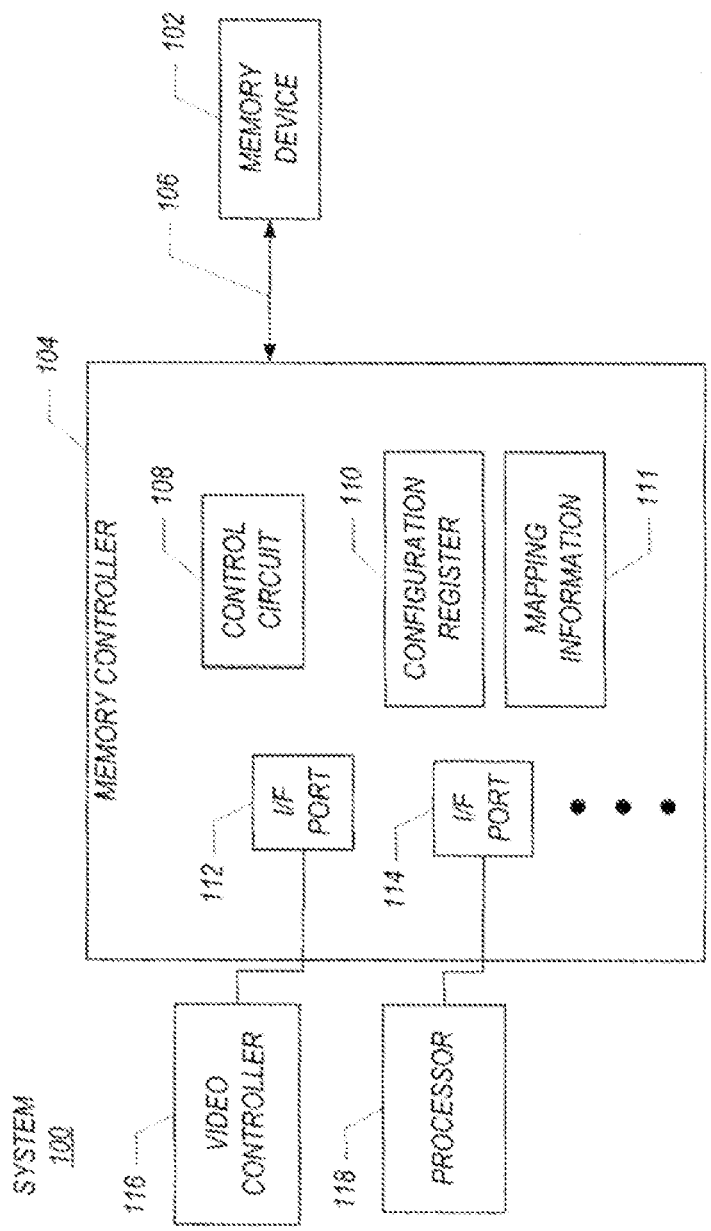
FIGS. 1 and 3 are block diagrams of exemplary systems incorporating some embodiments of the invention.

In accordance with some embodiments, a memory subsystem that has one or more memory devices can be configured to have multiple portions, where a first portion contains data with error correction code (ECC) information and a second portion contains data without ECC information. One example type of ECC is the Hamming code, which is able to correct single-bit errors and detect two-bit errors. Other types of ECC can be used in other implementations. More generally, ECC information refers to any information that allows detection and correction of data errors. The ECC information is used for detecting an error in associated data, and if the error involves up to a certain number (e.g., one or more) of data bits, the ECC information can be used to correct the data.

As used here, the term "data" refers generally to user data, software application data, software code, or any other information that is stored on behalf of components in a system or on behalf of devices or users outside the system. Data stored in a memory subsystem is contrasted with control information (such as ECC information) that is associated with the data and that is used to enable the performance of one or more tasks with respect to the data, such as error detection and/or correction, status indication, and so forth.

A memory controller that controls access of the memory subsystem is configured to store data with ECC information in the first portion of the memory subsystem, and to store data without ECC information in the second portion of the memory subsystem. As a result, no ECC protection is provided in the second portion of the memory subsystem.

By being able to divide the memory subsystem into multiple portions for which ECC protection is configurably enabled and disabled, more efficient usage of the storage capacity of the memory subsystem can be administered. Conventionally, ECC protection is either enabled or disabled for the entire memory subsystem. If enabled, that means that all data stored in the memory subsystem would have to be provided with ECC information. However, if ECC protection is disabled, then no ECC information is stored with data, which can result in system operation errors when errors occur in certain data.

One example of data that can be stored in the portion of the memory subsystem without ECC protection is video data. A characteristic of a video application is that there is a relatively large amount of video data, and high memory bandwidth is desirable for storing such video data. An error occurring in video data normally would not result in a system error. In fact, an error in video data may merely cause a visual artifact.

On the other hand, errors in data associated with software program code, for example, may cause a system to crash. Therefore, such data should be stored in the portion of the memory subsystem that is ECC protected.

By enabling ECC protection for one portion of the memory subsystem but disabling ECC protection for another portion of the memory subsystem, a balance can be achieved between the goals of increased memory subsystem performance and enhanced data integrity, information considered to be important can be stored in the portion of the memory subsystem with ECC protection. However, non-critical data can be stored in the portion of the memory subsystem without ECC protection.

The foregoing refers to a memory subsystem that can include one or multiple memory devices. In an alternative embodiment; the memory subsystem includes just a single memory device. As used here, the term "single memory device" refers to a device having memory storage circuitry that is provided on a single support substrate. In some embodiments, the support substrate is a semiconductor substrate on which memory cells and associated peripheral control circuitry are formed to provide a memory chip. A "chip" refers to an integrated circuit device that has circuitry encapsulated in packaging.

In an embodiment in which a single memory device is provided, a first part of the memory device is configured to store data with redundancy information, while a second part of the memory device is configured to store data without redundancy information. One example of redundancy information is ECC information. Alternatively, redundancy information can refer to other types of control information used for detecting or detecting and correcting data errors. Examples of such other types of redundancy information include parity information, cyclic redundancy check (CRC) information, and so forth.

FIG. 1 illustrates an exemplary system 100 that includes a memory device 102 that is coupled to a memory controller 104, where the memory controller 104 controls access of the memory device 102. Although a direct link 106 is shown between the memory controller 104 and the memory device 102, it is noted that the memory controller 104 in some implementations may be indirectly connected to the memory device 102, such as through an intermediate controller.

The memory controller 104 includes a control circuit 108 that receives requests for accessing (reading or writing) the memory device 102, and issues commands over the link 106 to the memory device 102 to perform the requested accesses. The memory controller 104 also includes at least one configuration register 110 that stores configuration information in accordance with an embodiment. The configuration information in the configuration register 110 can indicate which part of the memory device 102 is to store data with redundancy information (e.g., ECC information), and which other part of the memory device 102 is to store data without redundancy information (e.g., ECC information).

The part of the memory device 102 that is not ECC protected has a larger bandwidth, since all data pins of the memory device 102 are available for inputting and outputting data. On the other hand, the part of the memory device that is ECC protected has a lower bandwidth, since a portion of the data pins of the memory device 102 is used for inputting and outputting ECC information. Note that reference to "data pins" of the memory device 102 assumes a parallel data input/output (I/O) implementation in which there are multiple data pins to input and output multiple data bits. Examples of memory devices with parallel I/O implementations include DDR2 (double-data-rate-2) and DDR3 DRAMs (dynamic random access memories). However, in some other implementations, the memory device 102 can have a serial data I/O implementation, such as RAMBUS memory device or an FBD (fully buffered dual inline memory module) memory device. With a memory device having a serial I/O implementation, accessing the part of the memory device that is ECC protected will cause a portion of the data I/O bandwidth to be consumed by the input or output of ECC information.

The memory controller 104 also includes various interface ports 112, 114. The interface port 112 can be used to connect to a video controller 116, and the interface port 114 can be used to connect to a processor 118. The video controller 116 and processor 118 are separate from the memory controller 104. Other interface ports can also be provided in the memory controller 104 for connection to other types of devices in the system 100. The devices connected through the interface ports of the memory controller 104 are considered "requestors" that are able to submit requests to access the memory device 102.

In an alternative embodiment, instead of providing multiple interface ports in the memory controller 104 to corresponding different devices, one interface port can be provided in the memory controller 104 for connection to another controller, where this other controller can then be used to connect to other devices (e.g., the video controller 116 and processor 118) that are able to submit requests to the memory controller 104 for accessing the memory device 102. As yet another alternative, a bus structure can be implemented in which multiple requesters (devices requesting access of the memory controller 104) can arbitrate for a shared communication bus.

In some embodiments, the system 100 is an embedded system, which refers to a system on a chip. In an embedded system, the memory controller 104, video controller 116, processor 118, and other devices (not shown) may be formed on a common substrate. A characteristic, of an embedded system is that it is desirable that such embedded system be relatively low cost and consumes a relatively low amount of power. In some implementations, an embedded system can connect to an external memory device. Alternatively, the memory device can be provided on the same substrate as the other components of the embedded system.

Figure 2:
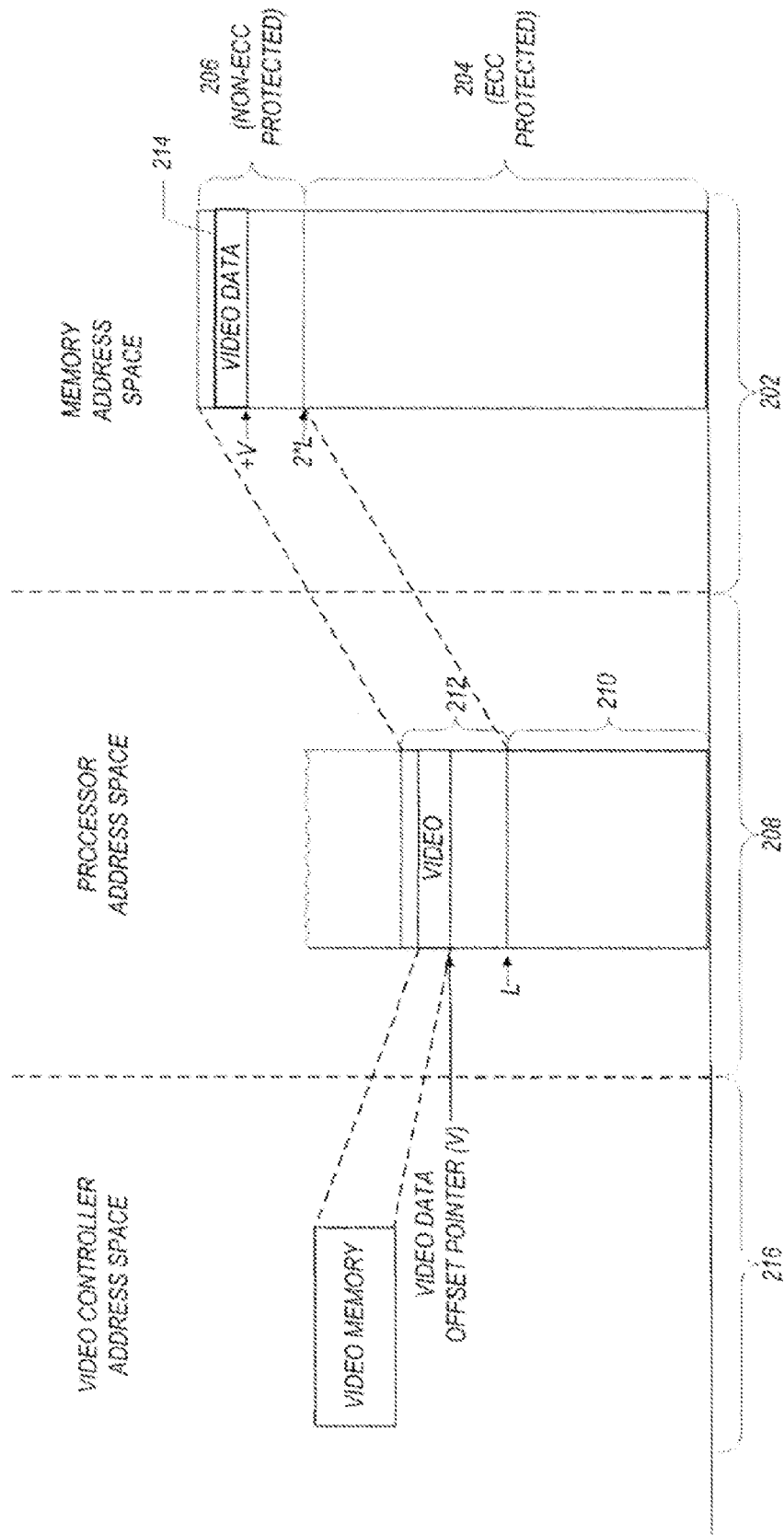
FIG. 2 is a diagram of address spaces according to an embodiment.

FIG. 2 is a diagram of three address spaces that may be present in the system 100, according to an example. A memory address space 202 is the address space of the memory device 102 of FIG. 1. The memory address space 202 represents the entire space available in the memory device 102 for storing information (including data and control information such as ECC information).

In accordance with some embodiments, the memory address space 202 of the memory device 102 is divided into a first part 204 that is ECC protected, and a second part 206 that is not ECC protected. Although FIG. 2 shows a specific embodiment, it is noted that other embodiments can be implemented. In FIG. 2, the lower part 204 of the memory address space 202 is ECC protected, while the upper part 206 is not ECC protected. Alternatively, the lower part 204 is not ECC protected, while the upper part 206 is ECC protected. As yet another alternative, a more complex arrangement of ECC and non-ECC protected parts can be defined, where the ECC and non-ECC parts may be interleaved or have some other complex arrangement with respect to each other. The definitions of such a complex arrangement can be accomplished by use of multiple configuration registers in the memory controller.

In the example of FIG. 2, video data 214 is stored in the non-ECC protected part 206 of the memory-address space 202 starting at offset V from the end of the ECC-protected part 204. The parameter L in FIG. 2 is a configurable parameter whose value can be set using the configuration register 110 of FIG. 1, for example. The parameter L defines the amount of address space allocated to ECC protected memory. In the example implementation of FIG. 2, it is assumed that ECC protection is performed on a byte-wise basis and will consume half of the ECC protected memory part 204 due to practical constraints of a 16-bit wide memory device. In other implementations, different amounts of the ECC protected memory part 204 would be consumed by ECC control information.

As a result of ECC protection in the first part 204 of the memory address space 202, the available address space in this first part 204 that can be used for actually storing data associated with a requestor (e.g., processor 118 in FIG. 1) is reduced. This reduced address space is represented as a processor address space 208 in FIG. 2, which represents the available portion of the memory device 102 that can actually be used to store data of the processor 118.

As shown in FIG. 2, the capacity of the part 204 of the memory address space 202 is 2*L, where 2*L represents the length (in bits or bytes) of the part 204 of the memory address space 202. The processor address space 208 also has an ECC-protected part 210 and part 212. However, the ECC-protected part 210 of the processor address space 208 has a reduced length compared to the part 204 of the original memory address space 202. In the example of FIG. 2, the ECC-protected part 210 of the processor address space 208 has a length of L, which is half the length (2*L) of the part 204 of the memory address space 202. This is based on the assumption that the ECC information stored in the part 204 will render half of the part 204 unavailable for storing data. In one example, to protect 8 bits of data, the ECC code can either be 5 bits or 6 bits in length. A typical memory device arrangement has 16 data pins. Thus, in such an arrangement, 8 of the data bits can be used for inputting and outputting data into the ECC-protected part 204 of the memory device, while the remaining 8 data pins are used to input and output ECC information (note that 2 or 3 of the data pins will be unused depending upon whether the ECC information is 5 bits or 6 bits in length). In other implementations, other arrangements are possible. For example, the 2 or 3 data pins can be used for inputting or outputting data, assuming that the memory controller 104 is configured to support such addressing.

Referring again to FIG. 2, the non-ECC protected part 212 of the processor address space 208 has the same length as the non-ECC protected part 206 of the memory address space 202. In the example of FIG. 2, video data 214 from video memory in a video controller address space 216 is stored in the non-ECC protected part 212 of the processor address space 208. The video controller address space 216 refers to the address space associated with the video controller 116 of FIG. 1.

Figure 3:
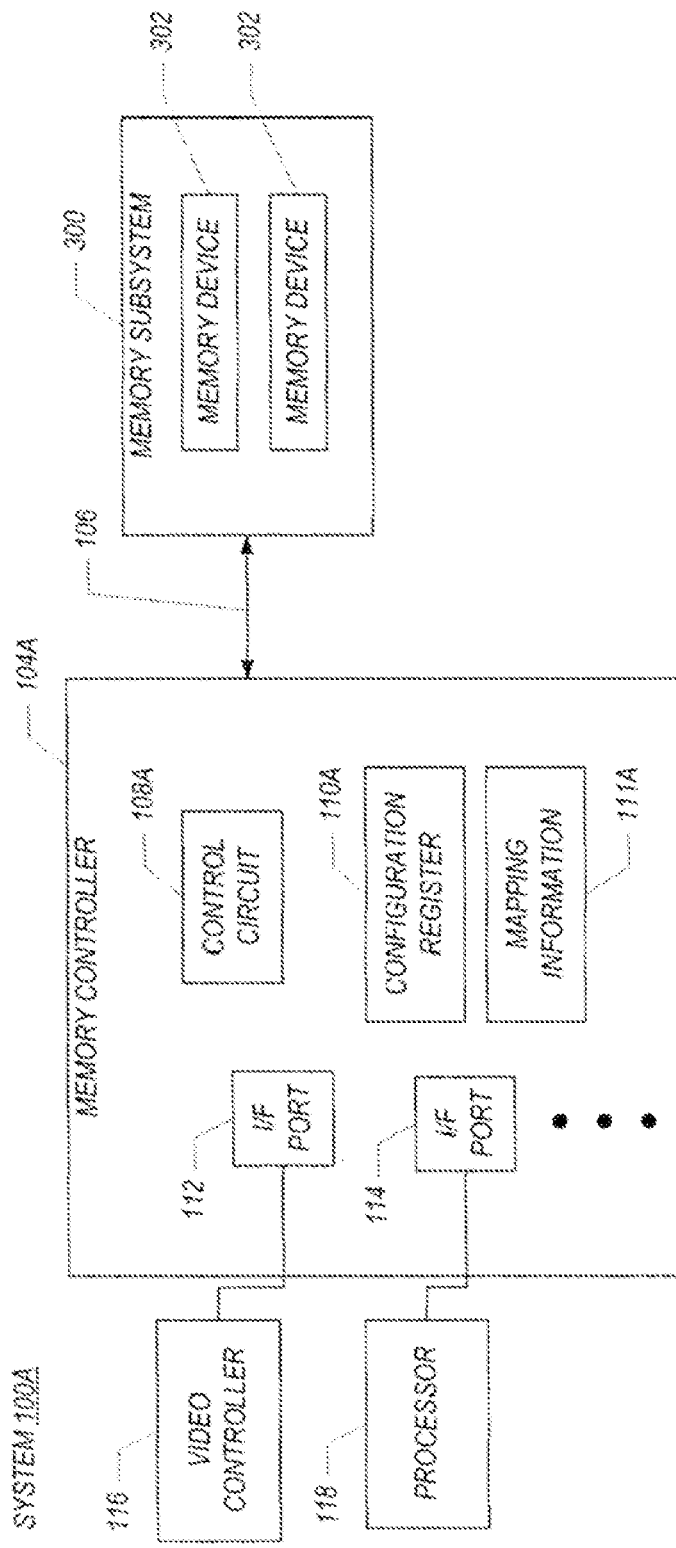

FIG. 3 illustrates an alternative embodiment of a system 100A that has a memory controller 104A for controlling access of a memory subsystem 300 that includes multiple memory devices 302 (unlike the embodiment of FIG. 1 that includes just a single memory device). Control circuitry 108A in the memory controller 104A is able to control access of the multiple memory devices 302 in the memory subsystem 300, and at least one configuration register 110A is used to store configuration information that indicates which portions of the memory subsystem 300 are protected with ECC information and which portions of the memory subsystem 300 are not protected with ECC information.

Figure 4:
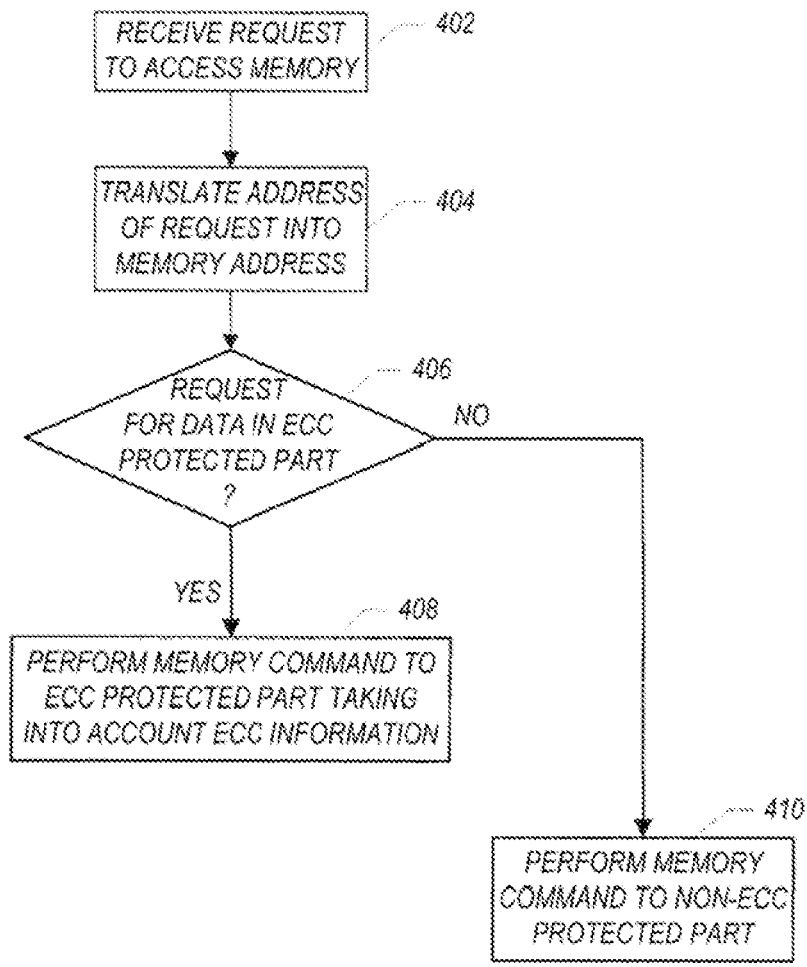
FIG. 4 is a flow diagram of a process performed by a memory controller according to an embodiment.

As shown in FIG. 4, during operation, the memory controller 104 or 104A in FIG. 1 or 3, respectively, receives (at 402) a request to access memory (the memory device 102 or the memory subsystem 300 of FIG. 1 or 3, respectively). The request can be received from any one of various requestors, including as examples the video controller 116 or processor 118 in FIG. 1.

The address of the request is translated (at 404) into a memory address using mapping information (111 or 111A) stored in the memory controller 104 or 104A. The translation is performed since provision of ECC protection in the ECC protected part of the memory has reduced the available space for storing data of a requester. As shown in FIG. 2, an address of a received request would be in the processor address space 208. This address is translated into a memory address in the memory address space 202. For example, an address K in the ECC protected part 210 of the processor address space 208 would be translated to 2*K in the ECC protected part 204 of the memory address space 202. An address M in the non-ECC protected part 212 of the processor address space 208 has two components: L+N, where L is the length of the ECC protected pan 212 of the processor address space, and N is the offset from L into the non-ECC protected part 212 of the processor address space 208. In this case, the address M is translated to 2*L+N. In other implementations, other translations are performed.

The mapping information 111 or 111A stored in the memory controller 104 or 104A provides the correlation between the processor address space 208 and the memory address space 202. The mapping information 111 or 111A, which can be stored in storage media of the memory controller 104 or 104A, accounts for the reduction in available space for data due to storage of ECC information in the ECC-protected part of memory.

Next, after translation of the address in the received request, it is determined (at 406) whether the received request is for data in the ECC protected part of the memory device. If so, a memory command (corresponding to the received request) performed (at 408) by the memory controller takes into account ECC information. If the memory command is a read command, then (assuming the example implementation described in FIG. 2) additional read operations may be performed to account for bandwidth consumed by ECC information. However, if the memory command is a write command, then the memory controller generates the corresponding ECC information for writing to the memory device.

On the other hand, if it is determined (at 406) that the request is for data in a non-ECC protected part, then a memory command (corresponding to the received request) is performed (at 410) without taking into account ECC information.

As noted above, a memory subsystem can be more efficiently utilized by being able to divide the memory subsystem into a portion that is ECC protected and another portion that is non-ECC protected. This benefit is particularly useful in a system having just a single memory device (such as a single memory chip) since the single memory device can be configured such that ECC is not applied to all data stored in the single memory device. For applications that involve a large amount of data and for which absolute data integrity is not critical, such as a video application, the data of such applications can be stored in the non-ECC protected portion of the memory.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A system comprising:
a memory subsystem having at least one memory device; and
a memory controller to control access of the memory subsystem, wherein the memory controller is configured to store data with error correction code (ECC) information in a first portion of the memory subsystem, and to store data without ECC information in a second portion of the memory subsystem, and wherein the memory controller is configured to further:
receive a request to access the memory subsystem from a requestor;
convert the request into at least one memory command that is sent to the memory subsystem; and
translate an address of the request into an address of the memory subsystem to include in the at least one memory command, wherein translation of the address of the request into the address of the memory subsystem is based on mapping information that accounts for a reduction in available space for data in the memory subsystem due to storage of the ECC information in the first portion.

2. The system of claim 1, wherein the memory subsystem includes a single memory device, wherein a first part of the memory device is to store data with ECC information, and a second part of the memory device is to store data without ECC information.

3. The system of claim 1, wherein the memory controller is configured with configuration information to indicate that the first portion of the memory subsystem is to be protected by ECC information, and that the second portion of the memory subsystem is not to be protected by ECC information.

4. The system of claim 3, wherein the memory controller includes at least one configuration register to store the configuration information.

5. The system of claim 1, wherein the memory controller includes the mapping information that maps a first address space of the requestor to a second address space of the memory subsystem, and wherein the first address space is smaller than the second address space.

6. The system of claim 5, wherein the translation of the address of the request into the address of the memory subsystem is based on the mapping information.

7. The system of claim 1, wherein the memory controller is connected over a direct link to the memory subsystem.

8. A method comprising:
 storing, by a memory controller, data with redundancy information in a first part of a memory device, and data without redundancy information in a second part of the memory device; and
 storing mapping information in the memory controller, the mapping information mapping an address space of a requestor that uses the memory device to an address space of the memory device, wherein the address space of the requestor is smaller than the address space of the memory device.

9. The method of claim 8, wherein storing data with the redundancy information comprises storing data with error correction code (ECC) information, and wherein storing data without redundancy information comprises storing data without ECC information.

10. The method of claim 8, further comprising:
 receiving, by the memory controller, a request from the requestor to access the memory device; and
 translate an address of the request into an address in the address space of the memory device using the mapping information, wherein the address of the request is in the address space of the requestor.

11. The method of claim 10, further comprising converting, by the memory controller, the request into one or more memory commands submitted to the memory device over a direct link between the memory controller and the memory device.

12. The method of claim 10, wherein the translating of the address of the request into the address in the address space of the memory device accounts for a reduction in available space for data in the memory device due to storage of the redundancy information in the first part of the memory device.

13. A memory controller for use with a memory subsystem having at least one memory device, comprising:
 a control circuit to send commands to the memory subsystem; and
 a storage to store:
  configuration information that indicates that a first portion of the memory subsystem is to store data with error correction code (ECC) information and a second portion of the memory subsystem is to store data without ECC information, and
  mapping information that maps a first address space of a requestor that uses the memory subsystem to a second address space of the memory subsystem, wherein the first address space is smaller than the second address space.

14. The memory controller of claim 13, wherein the control circuit is configured to further:
 receive a request from the requestor to access the memory subsystem; and
 translate, using the mapping information, an address of the request in the first address space into an address in the second address space.

15. The memory controller of claim 14, wherein the control circuit is configured to further convert the request into one or more memory commands submitted to the memory subsystem over a direct link between the memory controller and the memory subsystem.

16. The memory controller of claim 13, wherein the memory subsystem includes a single memory device.

* * * * *